US012236859B2

(12) United States Patent
Xu et al.

(10) Patent No.: US 12,236,859 B2
(45) Date of Patent: Feb. 25, 2025

(54) PIXEL CIRCUIT AND DRIVING METHOD THEREOF, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Xin Xu, Beijing (CN); Tsanghong Wang, Beijing (CN); Hsinwei Huang, Beijing (CN); Chunyang Li, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/021,549

(22) PCT Filed: Apr. 18, 2022

(86) PCT No.: PCT/CN2022/087407

§ 371 (c)(1),
(2) Date: Feb. 15, 2023

(87) PCT Pub. No.: WO2023/201468

PCT Pub. Date: Oct. 26, 2023

(65) Prior Publication Data

US 2024/0265862 A1 Aug. 8, 2024

(51) Int. Cl.
*G09G 3/3225* (2016.01)

(52) U.S. Cl.
CPC ... *G09G 3/3225* (2013.01); *G09G 2300/0819* (2013.01); *G09G 2300/0842* (2013.01); *G09G 2300/0861* (2013.01); *G09G 2320/0233* (2013.01); *G09G 2330/021* (2013.01); *G09G 2340/0435* (2013.01)

(58) Field of Classification Search
CPC combination set(s) only.
See application file for complete search history.

(56) References Cited

U.S. PATENT DOCUMENTS

| | | | |
|---|---|---|---|
| 10,431,160 | B2 | 10/2019 | Zhang et al. |
| 10,614,740 | B2 | 4/2020 | Lee et al. |
| 2003/0098657 | A1 | 5/2003 | Suzuki |

(Continued)

FOREIGN PATENT DOCUMENTS

| | | | |
|---|---|---|---|
| CN | 101123065 | A | 2/2008 |
| CN | 107316613 | A | 11/2017 |

(Continued)

*Primary Examiner* — William Boddie
*Assistant Examiner* — Alecia D English
(74) *Attorney, Agent, or Firm* — IPro, PLLC

(57) ABSTRACT

Provided is a pixel circuit. The pixel circuit includes: a data writing circuit, coupled to a first gate signal terminal, a second gate signal terminal, a third gate signal terminal, a data signal terminal, a first node, a second node and a third node; a light emission control circuit, coupled to a light emission control terminal, a first power supply terminal, the first node, the third node and a light-emitting element; and a drive circuit, wherein an input terminal, a control terminal and an output terminal of the drive circuit are coupled to the first node, the second node and the third node respectively.

20 Claims, 9 Drawing Sheets

(56) References Cited

U.S. PATENT DOCUMENTS

| | | | | |
|---|---|---|---|---|
| 2008/0036706 | A1 | 2/2008 | Kitazawa | |
| 2011/0193855 | A1* | 8/2011 | Han | G09G 3/3266 345/76 |
| 2015/0145849 | A1 | 5/2015 | Choi et al. | |
| 2018/0182346 | A1 | 6/2018 | Ryu et al. | |
| 2018/0218683 | A1 | 8/2018 | Huangfu et al. | |
| 2019/0197957 | A1* | 6/2019 | Miura | H10K 59/121 |
| 2019/0340977 | A1 | 11/2019 | Park et al. | |
| 2021/0065638 | A1 | 3/2021 | Okita | |
| 2021/0248961 | A1 | 8/2021 | Yang et al. | |
| 2021/0287614 | A1 | 9/2021 | Xiong et al. | |
| 2021/0327352 | A1 | 10/2021 | Zhang et al. | |
| 2022/0051633 | A1* | 2/2022 | Li | G09G 3/3266 |
| 2022/0114943 | A1 | 4/2022 | Cao | |
| 2024/0021141 | A1* | 1/2024 | Huang | G09G 3/3233 |

FOREIGN PATENT DOCUMENTS

| | | | |
|---|---|---|---|
| CN | 208922723 | U | 5/2019 |
| CN | 109979377 | A | 7/2019 |
| CN | 111862890 | A | 10/2020 |
| CN | 112102778 | A | 12/2020 |
| CN | 112216244 | A | 1/2021 |
| CN | 112562593 | A | 3/2021 |
| CN | 112634832 | A | 4/2021 |
| CN | 113012643 | A | 6/2021 |
| CN | 113223461 | A | 8/2021 |
| CN | 113539174 | A | 10/2021 |
| CN | 113674690 | A | 11/2021 |
| CN | 114361228 | A | 4/2022 |
| JP | 2019516118 | A | 6/2019 |
| JP | 2021033127 | A | 3/2021 |

* cited by examiner

PIXEL CIRCUIT AND DRIVING METHOD THEREOF, AND DISPLAY DEVICE

CROSS-REFERENCE TO RELATED APPLICATIONS

This application is a U.S. national stage of international application No. PCT/CN2022/087407, filed on Apr. 18, 2022, the disclosure of which is incorporated herein by reference in its entirety.

TECHNICAL FIELD

The present disclosure relates to the field of display technologies, and in particular, relates to a pixel circuit and a driving method thereof, and a display device.

BACKGROUND OF THE INVENTION

A display device generally includes a plurality of pixels, and each pixel includes a pixel circuit and a light-emitting element which are coupled to each other. The pixel circuit transmits a light emission driving signal to the light-emitting element to drive the light-emitting element to emit light.

SUMMARY OF THE INVENTION

The present disclosure provides a pixel circuit and a driving method thereof, and a display device. The technical solutions are as follows.

In some embodiments of the present disclosure, a pixel circuit is provided. The pixel circuit includes:

- a data writing circuit, coupled to a first gate signal terminal, a second gate signal terminal, a third gate signal terminal, a data signal terminal, a first node, a second node and a third node, wherein the data writing circuit is configured to control conduction/non-conduction between the data signal terminal and the first node and conduction/non-conduction between the second node and the third node in response to a first gate driving signal provided by the first gate signal terminal, a second gate driving signal provided by the second gate signal terminal, and a third gate driving signal provided by the third gate signal terminal; wherein a first parasitic capacitance is formed between the second gate signal terminal and the second node, and a second parasitic capacitance is formed between the third gate signal terminal and the second node;
- a light emission control circuit, coupled to a light emission control terminal, a first power supply terminal, the first node, the third node and a light-emitting element, wherein the light emission control circuit is configured to control conduction/non-conduction between the first power supply terminal and the first node and conduction/non-conduction between the third node and the light-emitting element in response to a light emission control signal provided by the light emission control terminal; and
- a drive circuit, wherein an input terminal, a control terminal and an output terminal of the drive circuit are coupled to the first node, the second node and the third node respectively, and the drive circuit is configured to transmit a light emission driving signal to the third node based on a potential at the first node and a potential at the second node.

In some embodiments, the data writing circuit includes a data writing sub-circuit and a compensation sub-circuit; wherein

- the data writing sub-circuit is coupled to the first gate signal terminal, the second gate signal terminal, the data signal terminal and the first node, and configured to control conduction/non-conduction between the data signal terminal and the first node in response to the first gate driving signal and the second gate driving signal; and
- the compensation sub-circuit is coupled to the third gate signal terminal, the second node and the third node, and configured to control conduction/non-conduction between the second node and the third node in response to the third gate driving signal.

In some embodiments, the data writing sub-circuit includes a first data writing unit and a second data writing unit; wherein

- the first data writing unit is coupled to the first gate signal terminal, the data signal terminal and the first node, and configured to control the conduction/non-conduction between the data signal terminal and the first node in response to the first gate driving signal; and
- the second data writing unit is coupled to the second gate signal terminal, the data signal terminal and the first node, and configured to control the conduction/non-conduction between the data signal terminal and the first node in response to the second gate driving signal.

In some embodiments, the first data writing unit includes a first data writing transistor, and the second data writing unit includes a second data writing transistor; wherein

- a gate of the first data writing transistor is coupled to the first gate signal terminal, a first electrode of the first data writing transistor is coupled to the data signal terminal, and a second electrode of the first data writing transistor is coupled to the first node; and
- a gate of the second data writing transistor is coupled to the second gate signal terminal, a first electrode of the second data writing transistor is coupled to the data signal terminal, and a second electrode of the second data writing transistor is coupled to the first node.

In some embodiments, the first data writing transistor and the second data writing transistor are P-type transistors.

In some embodiments, the compensation sub-circuit includes a compensation transistor; wherein

- a gate of the compensation transistor is coupled to the third gate signal terminal, a first electrode of the compensation transistor is coupled to the third node, and a second electrode of the compensation transistor is coupled to the second node.

In some embodiments, the compensation transistor is an N-type transistor.

In some embodiments, the drive circuit includes a driving transistor, the driving transistor being a P-type transistor; wherein

- a gate of the driving transistor is coupled to the second node, a first electrode of the driving transistor is coupled to the first node, and a second electrode of the driving transistor is coupled to the third node.

In some embodiments, the light emission control circuit includes a first light emission control sub-circuit, a second light emission control sub-circuit and an adjustment sub-circuit; wherein

- the first light emission control sub-circuit is coupled to the light emission control terminal, the first power supply terminal and the first node, and configured to control the conduction/non-conduction between the first power supply terminal and the first node in response to the light emission control signal;

the second light emission control sub-circuit is coupled to the light emission control terminal, the third node and a first electrode of the light-emitting element, a second electrode of the light-emitting element is coupled to a second power supply terminal, and the second light emission control sub-circuit is configured to control conduction/non-conduction between the third node and the first electrode of the light-emitting element in response to the light emission control signal; and the adjustment sub-circuit is coupled to the second node and the first power supply terminal, and configured to adjust the potential at the second node based on a first power supply signal provided by the first power supply terminal.

In some embodiments, the first light emission control sub-circuit includes a first light emission control transistor; the second light emission control sub-circuit includes a second light emission control transistor; the first light emission control transistor and the second light emission control transistor are N-type transistors; and the adjustment sub-circuit includes a storage capacitor; wherein a gate of the first light emission control transistor is coupled to the light emission control terminal, a first electrode of the first light emission control transistor is coupled to the first power supply terminal, and a second electrode of the first light emission control transistor is coupled to the first node;

a gate of the second light emission control transistor is coupled to the light emission control terminal, a first electrode of the second light emission control transistor is coupled to the third node, and a second electrode of the second light emission control transistor is coupled to the first electrode of the light-emitting element; and one terminal of the storage capacitor is coupled to the first power supply terminal, and the other terminal of the storage capacitor is coupled to the second node.

In some embodiments, the pixel circuit further includes a first reset circuit and a second reset circuit; wherein the first reset circuit is coupled to a reset signal terminal, a first reset power supply terminal and the second node, and configured to control conduction/non-conduction between the first reset power supply terminal and the second node in response to a reset signal provided by the reset signal terminal; and the second reset circuit is coupled to the first gate signal terminal, a second reset power supply terminal and the light-emitting element, and configured to control conduction/non-conduction between the second reset power supply terminal and the light-emitting element in response to the first gate driving signal.

In some embodiments, the first reset circuit includes a first reset transistor; and the second reset circuit includes a second reset transistor; the first reset transistor being an N-type transistor and the second reset transistor being a P-type transistor; wherein a gate of the first reset transistor is coupled to the reset signal terminal, a first electrode of the first reset transistor is coupled to the first reset power supply terminal, and a second electrode of the first reset transistor is coupled to the second node; and a gate of the second reset transistor is coupled to the first gate signal terminal, a first electrode of the second reset transistor is coupled to the second reset power supply terminal, and a second electrode of the second reset transistor is coupled to the light-emitting element.

In some embodiments of the present disclosure, a method for driving a pixel circuit is provided. The method is applicable for driving the pixel circuit described in the above embodiments. The method includes: a first stage and a second stage sequentially executed at a refresh frame in multi-frame scanning, and a third stage and the second stage sequentially executed at a hold frame in the multi-frame scanning; wherein in the first stage, a potential of a light emission control signal provided by a light emission control terminal, a potential of a second gate driving signal provided by a second gate signal terminal and a potential of a third gate driving signal provided by a third gate signal terminal all are first potentials, a potential of a first gate driving signal provided by a first gate signal terminal is a second potential, and a data writing circuit controls a data signal terminal to be conducted with a first node in response to the first gate driving signal, and controls a second node to be conducted with a third node in response to the third gate driving signal;

in the second stage, the potential of the first gate driving signal and the potential of the second gate driving signal are the first potentials, the potential of the light emission control signal and the potential of the third gate driving signal are the second potentials, a light emission control circuit controls a first power supply terminal to be conducted with the first node and controls the third node to be conducted with a light-emitting element in response to the light emission control signal, and a drive circuit transmits a light emission driving signal to the third node based on a potential at the first node and a potential at the second node; and in the third stage, the potential of the light emission control signal and the potential of the first gate driving signal are the first potentials, the potential of the second gate driving signal and the potential of the third gate driving signal are the second potentials, and the data writing circuit controls the data signal terminal to be conducted with the first node in response to the second gate driving signal.

In some embodiments, the method further includes: a fourth stage executed before the first stage at the refresh frame; wherein in the fourth stage, a potential of a reset signal provided by a reset signal terminal, the potential of the light emission control signal, the potential of the first gate driving signal and the potential of the second gate driving signal are the first potentials, the potential of the third gate driving signal is the second potential, and the first reset circuit controls a first reset power supply terminal to be conducted with the second node in response to the reset signal; and in the first stage, a second reset circuit controls a second reset power supply terminal to be conducted with the light-emitting element in response to the first gate driving signal.

In some embodiments of the present disclosure, a display device is provided. The display device includes: a display panel, a display drive circuit, and a plurality of pixels disposed on the display panel, wherein the pixel includes a light-emitting element and the pixel circuit as described in the above embodiments; wherein the display drive circuit is coupled to each signal terminal coupled to the pixel circuit, and configured to provide a signal to each signal terminal; and the pixel circuit is coupled to the light-emitting element, and configured to transmit a light emission driving signal to the light-emitting element, and the light-emitting element is configured to emit light based on the light emission driving signal.

BRIEF DESCRIPTION OF DRAWINGS

For a clearer description of the technical solutions in the embodiments of the present disclosure, the following briefly introduces the accompanying drawings required for describing the embodiments. The accompanying drawings in the following description show merely some embodiments of the present disclosure, and a person of ordinary skill in the art may still derive other drawings from these accompanying drawings without creative effort.

DETAILED DESCRIPTION

Figure 1:
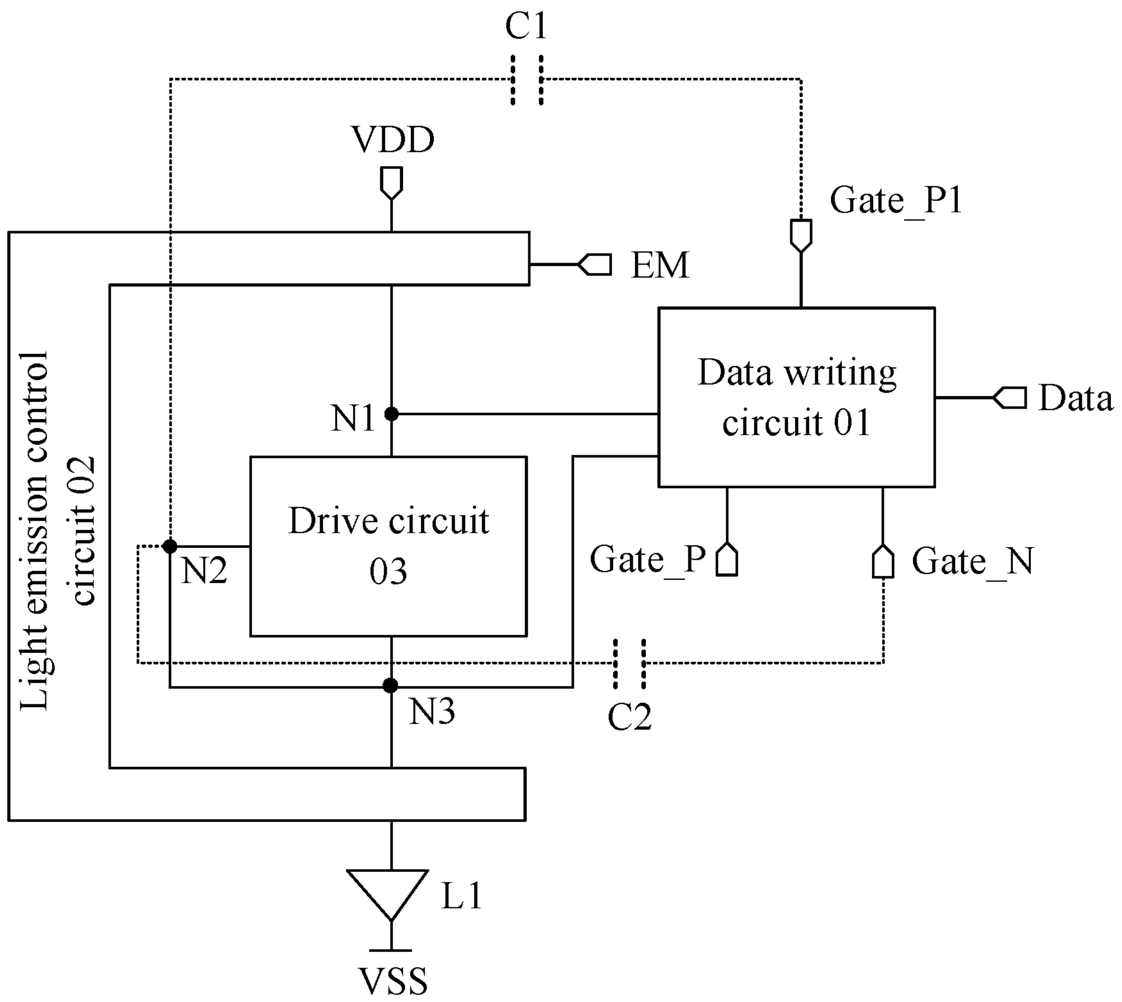
FIG. 1 is a structural schematic diagram of a pixel circuit according to some embodiments of the present disclosure.

To make the object, technical solutions and advantages of the present disclosure clearer, the embodiments of the present disclosure are further described in detail below in combination with the accompanying drawings.

Transistors used in all embodiments of the present disclosure may be field-effect transistors or other devices having the same properties, and the transistors are mainly switching transistors according to their functions in a circuit. Since a source and a drain of the switching transistor used here are symmetrical, the source and the drain of the switching transistor are interchangeable. In the embodiments of the present disclosure, the source is referred to as a first electrode and the drain is referred to as a second electrode; or the drain is referred to as a first electrode and the source is referred to as a second electrode. According to the form in the figure, it's specified that a middle terminal of the transistor is as a gate, a signal input terminal is the source, and a signal output terminal is the drain. In addition, the switching transistors used in the embodiments of the present disclosure may include either P-type switching transistors or N-type switching transistors. The P-type switching transistor is turned on when the gate is at a low level and is turned off when the gate is at a high level, and the N-type switching transistor is turned on when the gate is at the high level and is turned off when the gate is at the low level. In addition, a plurality of signals in various embodiments of the present disclosure each correspond to an effective potential and an ineffective potential. The effective potential and the ineffective potential only represent that the potential of the signal has two state quantities, instead of representing that the effective potential or the ineffective potential in the whole text has a specific value.

At present, the pixel circuit generally includes a data writing circuit and a drive circuit. The data writing circuit is coupled to two gate signal terminals, a data signal terminal, and an input terminal, a control terminal and an output terminal of the drive circuit. The output terminal of the drive circuit is further coupled to the light-emitting element. The data writing circuit writes a data signal from the data signal terminal to the input terminal and the control terminal of the drive circuit in response to a gate driving signal provided by each gate signal terminal. The drive circuit transmits the light emission driving signal to the light-emitting element through the output terminal of the drive circuit based on potentials at the control terminal and the input terminal of the drive circuit. In addition, a parasitic capacitance is further formed between one of the two gate signal terminals and the control terminal of the drive circuit.

At present, driving a light-emitting element to emit light by a pixel circuit at least includes the following two stages: a data writing stage and a light emission stage. In the data writing stage, a gate signal terminal provides a gate driving signal at an effective potential, such that a data writing circuit writes a data signal provided by a data signal terminal to an input terminal and a control terminal of a drive circuit in response to the gate driving signal at the effective potential. In the light emission stage, the potential of the gate driving signal jumps from the effective potential to the ineffective potential. At this time, the drive circuit transmits a light emission driving signal to the light-emitting element based on potentials at the input terminal and the control terminal of the drive circuit to drive the light-emitting element to emit light.

However, due to the coupling effect of the parasitic capacitance formed between the gate signal terminal and the control terminal of the drive circuit, the potential at the control terminal of the drive circuit shifts with the jump of the potential of the gate driving signal. For example, assuming that the effective potential is a high potential and the ineffective potential is a low potential, then after the data signal is written, when the potential of the gate driving signal jumps from the high potential to the low potential, the potential at the control terminal of the drive circuit is pulled down under the coupling effect of the parasitic capacitance, resulting in a negative shift. Due to this negative shift, the luminance of light emitted by the light-emitting element under the drive of the pixel circuit is different when two adjacent frames are scanned, resulting in a relatively poor display effect of the display device.

The relatively poor display uniformity described above is improved by adjusting the potential of the data signal. For example, if the potential at the control terminal of the drive circuit is pulled down at a current frame, the potential of the data signal is increased at a next frame to compensate for the potential at the control terminal of the drive circuit, so as to ensure that the potential at the control terminal of the drive circuit is substantially the same at the two frames. However, an increase in the potential of the data signal undoubtedly leads to a relatively large difference between the potentials of the data signal at the two frames, that is, the data range of the potential of the data signal is wider. As a result, the power consumption of a circuit (such as a source drive circuit) that provides the data signal to the data signal terminal is relatively high, and the operating power consumption of a display panel in the display device increases.

Moreover, at present, the panels in various display devices support a relatively high refresh rate, such as 120 Hz. Although the high refresh rate improves the display effect of the display device, it also brings a great challenge to the operating power consumption of the panel. Furthermore, the panel does not need to maintain a high refresh rate all the time during daily use. For example, a low refresh rate also meets demands in a reading mode. Therefore, during the development of the panel, it is necessary to reduce the operating power consumption of the panel from other aspects as much as possible.

Based on this, the embodiments of the present disclosure provide a pixel circuit. A display device adopting this pixel circuit not only has a relatively good display effect, but also has low power consumption.

FIG. 1 is a structural schematic diagram of a pixel circuit according to some embodiments of the present disclosure. As shown in FIG. 1, the pixel circuit includes a data writing circuit 01, a light emission control circuit 02 and a drive circuit 03.

The data writing circuit 01 is coupled to a first gate signal terminal Gate_P, a second gate signal terminal Gate_P1, a third gate signal terminal Gate_N, a data signal terminal Data, a first node N1, a second node N2 and a third node N3. The data writing circuit 01 is configured to control the conduction/non-conduction between the data signal terminal Data and the first node N1 as well as the conduction/non-conduction between the second node N2 and the third node N3 in response to a first gate driving signal provided by the first gate signal terminal Gate_P, a second gate driving signal provided by the second gate signal terminal Gate_P1, and a third gate driving signal provided by the third gate signal terminal Gate_N.

For example, the data writing circuit 01 controls the data signal terminal Data to be conducted with the first node N1 when a potential of the first gate driving signal provided by the first gate signal terminal Gate_P is an effective potential and/or a potential of the second gate driving signal provided by the second gate signal terminal Gate_P1 is an effective potential. In this case, a data signal provided by the data signal terminal Data is transmitted to the first node N1. The data writing circuit 01 controls the data signal terminal Data to be non-conducted with the first node N1 when the potential of the first gate driving signal is an ineffective potential and the potential of the second gate driving signal provided is an ineffective potential.

Similarly, the data writing circuit 01 controls the second node N2 to be conducted with the third node N3 when a potential of the third gate driving signal provided by the third gate signal terminal Gate_N is an effective potential. In this case, a potential at the second node N2 and a potential at the third node N3 affect each other. In addition, the data writing circuit 01 controls the second node N2 to be non-conducted with the third node N3 when the potential of the third gate driving signal is the ineffective potential.

Optionally, the data writing circuit 01 includes three transistors which are coupled to the first gate signal terminal Gate_P, the second gate signal terminal Gate_P1 and the third gate signal terminal Gate_N respectively. In addition, among the three transistors, the transistor coupled to the first gate signal terminal Gate_P and the transistor coupled to the second gate signal terminal Gate_P1 are P-type transistors, and the transistor coupled to the third gate signal terminal Gate_N is an N-type transistor. On this basis, the ineffective potential of the first gate driving signal and the ineffective potential of the second gate driving signal are high potentials, and the effective potential of the first gate driving signal and the effective potential of the second gate driving signal are low potentials. The ineffective potential of the third gate driving signal is a low potential, and the effective potential of the third gate driving signal is a high potential. In the following embodiments of the present disclosure, the high potential is referred to as a first potential and the low potential is referred to as a second potential.

Referring to FIG. 1, it can be seen that in the embodiment of the present disclosure, after the second gate signal terminal Gate_P1 is added, not only a second parasitic capacitance C2 is formed between the third gate signal terminal Gate_N and the second node N2, but also a first parasitic capacitance C1 is formed between the second gate signal terminal Gate_P1 and the second node N2. Thus, under the coupling effect of the second parasitic capacitance C2, the potential at the second node N2 shifts with the jump of the potential of the third gate driving signal. In addition, under the coupling effect of the first parasitic capacitance C1, the potential at the second node N2 shifts with the jump of the potential of the second gate driving signal. Therefore, the potential of the second gate driving signal and the potential of the third gate driving signal is flexibly adjusted, such that the potential at the second node N2 shifts positively (that is, the potential increases) and negatively (that is, the potential decreases) respectively at different stages to ensure that the potential at the second node N2 ultimately keeps stable, thereby solving the problem of display non-uniformity described in the above embodiment. Moreover, on the basis that the potential at the second node N2 keeps stable, the potential range of the data signal to be provided by the data signal terminal Data keeps substantially the same at two frames, that is, the data range narrows. Therefore, compared with the related art, the power consumption of the source drive circuit that provides the data signal for the data signal terminal is effectively reduced, and the operating power consumption of the panel is reduced.

For example, in the embodiments of the present disclosure, when the panel adopts a low-frequency refresh mode, the multi-frame scanning includes scanning a refresh frame and scanning a hold frame. Refresh scanning is performed at the refresh frame, and only display rather than refresh scanning is performed at the hold frame. At the refresh frame, the potential of the first gate driving signal is controlled to be the low potential, and the potential of the third gate driving signal is controlled to be the high potential, so as to write the data signal to the first node N1 and the second node N2. After the data signal is written, the potential of the first gate driving signal is controlled to jump to the high potential and the potential of the third gate driving signal is controlled to jump to the low potential. At this time, under the coupling effect of the second parasitic capacitance C2, the potential at the second node N2 is pulled down. At the hold frame, the potential of the second gate driving signal is controlled to be the low potential, so as to write the data signal to the first node N1. After the data signal is written, the potential of the second gate driving signal is controlled to jump to the high potential. At this time, under the coupling effect of the first parasitic capacitance C1, the potential at the second node N2 is pulled up. In this way, it is ensured that the potential at the second node N2 keeps stable, thereby ensuring a relatively good display effect and achieving the purpose of reducing the power consumption of the panel at the hold frame stage in a low refresh rate mode.

The light emission control circuit 02 is coupled to a light emission control terminal EM, a first power supply terminal VDD, the first node N1, the third node N3 and a light-emitting element L1. The light emission control circuit 02 is configured to control the conduction/non-conduction between the first power supply terminal VDD and the first node N1 and the conduction/non-conduction between the third node N3 and the light-emitting element L1 in response to a light emission control signal provided by the light emission control terminal EM.

For example, the light emission control circuit 02 controls the first power supply terminal VDD to be conducted with the first node N1 and control the third node N3 to be conducted with the light-emitting element L1 when a potential of the light emission control signal is the first potential. At this time, a first power supply signal provided by the first power supply terminal VDD is transmitted to the first node N1, and the potential at the third node N3 is transmitted to the light-emitting element L1. In addition, the light emission control circuit 02 controls the first power supply terminal VDD to be non-conducted with the first node N1 and control the third node N3 to be non-conducted with the light-emitting element L1 when the potential of the light emission control signal is the second potential.

Optionally, the light emission control circuit 02 is coupled to a first electrode of the light-emitting element L1, and a second electrode of the light-emitting element L1 is coupled to a second power supply terminal VSS. In addition, as shown in FIG. 1, the first electrode of the light-emitting element L1 is an anode, and the second electrode of the light-emitting element L1 is a cathode. Certainly, in some other embodiments, the first electrode of the light-emitting element L1 is a cathode, and correspondingly, the second electrode of the light-emitting element L1 is an anode.

An input terminal, a control terminal and an output terminal of the drive circuit 03 are coupled to the first node N1, the second node N2 and the third node N3 respectively. That is, the input terminal of the drive circuit 03 is coupled to the first node N1, the control terminal of the drive circuit 03 is coupled to the second node N2, and the output terminal of the drive circuit 03 is coupled to the third node N3. The drive circuit 03 is configured to transmit a light emission driving signal (such as a driving current) to the third node N3 based on the potential at the first node N1 and the potential at the second node N2.

After the light emission control circuit 02 controls the third node N3 to be conducted with the anode of the light-emitting element L1, the light emission driving signal is transmitted to the anode of the light-emitting element L1 through the light emission control circuit 02. The light-emitting element L1 emits light under the action of a voltage difference between the light emission driving signal and a second power supply signal provided by the second power supply terminal VSS coupled to the cathode of the light-emitting element L1. It should be noted that because the light emission driving signal is transmitted to the anode of the light-emitting element L1 through the light emission control circuit 02, the potential of the light emission driving signal finally transmitted to the anode of the light-emitting element L1 is different from the potential of the light emission driving signal generated by the drive circuit 03 based on the potential at the first node N1 and the potential at the second node N2.

In summary, the embodiments of the present disclosure provide a pixel circuit. In the pixel circuit, the data writing circuit is coupled to three gate signal terminals, and controls the potential at the first node, the potential at the second node and the potential at the third node under the control of the gate driving signals provided by the three gate signal terminals. The drive circuit transmits the light emission driving signal to the third node based on the potential at the first node and the potential at the second node. The light emission control circuit controls the third node to be conducted with the light-emitting element, such that the light emission driving signal is further transmitted to the light-emitting element, thereby turning on the light-emitting element. Moreover, the parasitic capacitance is formed between each of the two gate signal terminals and the second node. In this way, the potential at the second node can keep stable by flexibly adjusting the gate driving signals provided by the two gate signal terminals, such that the luminance of the light-emitting element is the same when the pixel circuit drives the light-emitting element at different frames, and the display device has a relatively good display effect.

Figure 2:
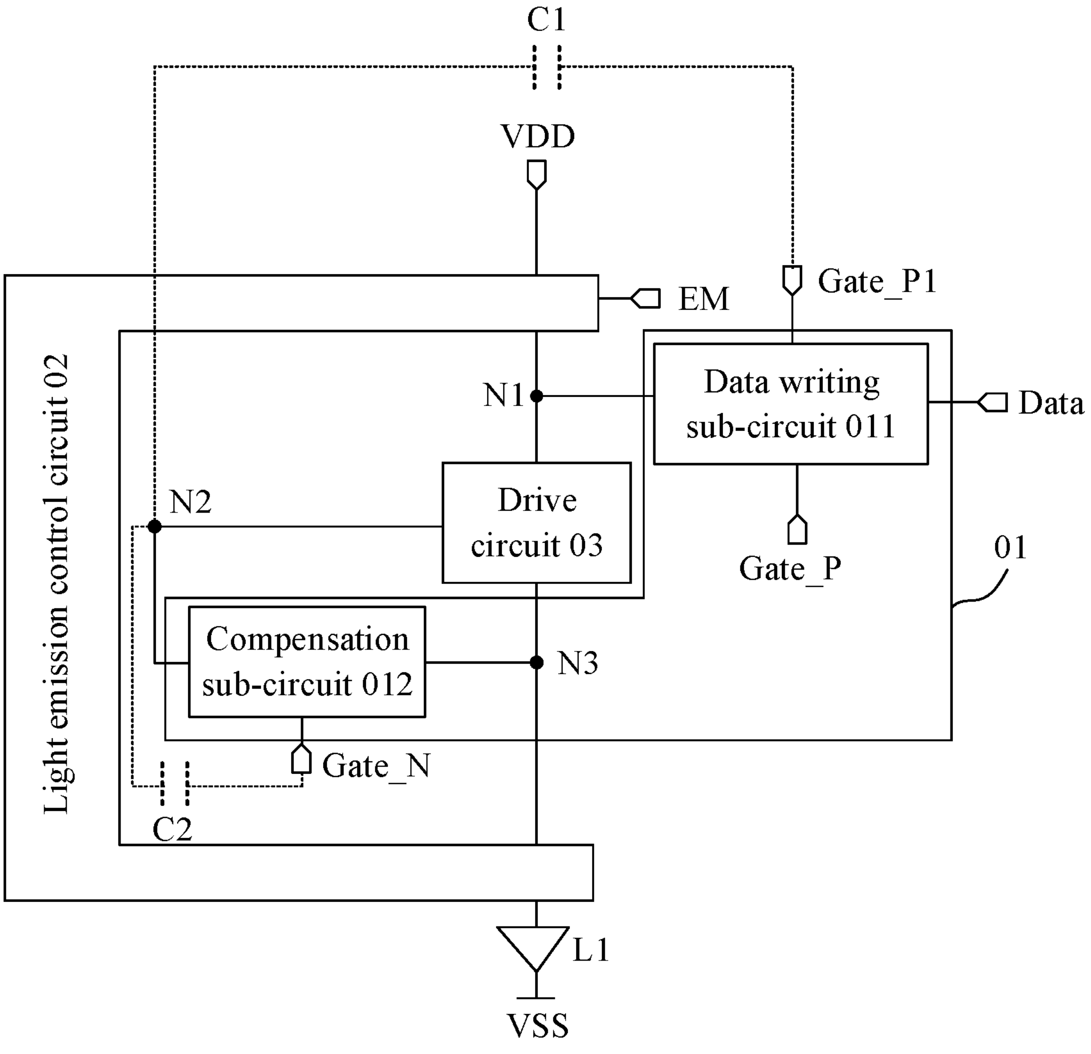
FIG. 2 is a structural schematic diagram of another pixel circuit according to some embodiments of the present disclosure.

FIG. 2 is a structural schematic diagram of another pixel circuit according to some embodiments of the present disclosure. As shown in FIG. 2, the data writing circuit 01 in the pixel circuit includes a data writing sub-circuit 011 and a compensation sub-circuit 012.

The data writing sub-circuit 011 is coupled to the first gate signal terminal Gate_P, the second gate signal terminal Gate_P, the data signal terminal Data and the first node N1. The data writing sub-circuit 011 is configured to control the conduction/non-conduction between the data signal terminal Data and the first node N1 in response to the first gate driving signal and the second gate driving signal.

For example, the data writing sub-circuit 011 controls the data signal terminal Data to be conducted with the first node N1 when the potential of the first gate driving signal is the effective potential and/or the potential of the second gate driving signal is the effective potential, such that the data signal is transmitted to the first node N1. In addition, the data writing sub-circuit 011 controls the data signal terminal Data to be non-conducted with the first node N1 when the potential of the first gate driving signal is the ineffective potential and the potential of the second gate driving signal is the ineffective potential.

The compensation sub-circuit 012 is coupled to the third gate signal terminal Gate_N, the second node N2 and the third node N3. The compensation sub-circuit 012 is configured to control the conduction/non-conduction between the second node N2 and the third node N3 in response to the third gate driving signal.

For example, the compensation sub-circuit 012 controls the second node N2 to be conducted with the third node N3 when the potential of the third gate driving signal is the effective potential, so as to compensate for the potential at the second node N2 based on the potential of the third node N3. In addition, the compensation sub-circuit 012 controls the second node N2 to be non-conducted with the third node N3 when the potential of the third gate driving signal is the ineffective potential.

Figure 3:
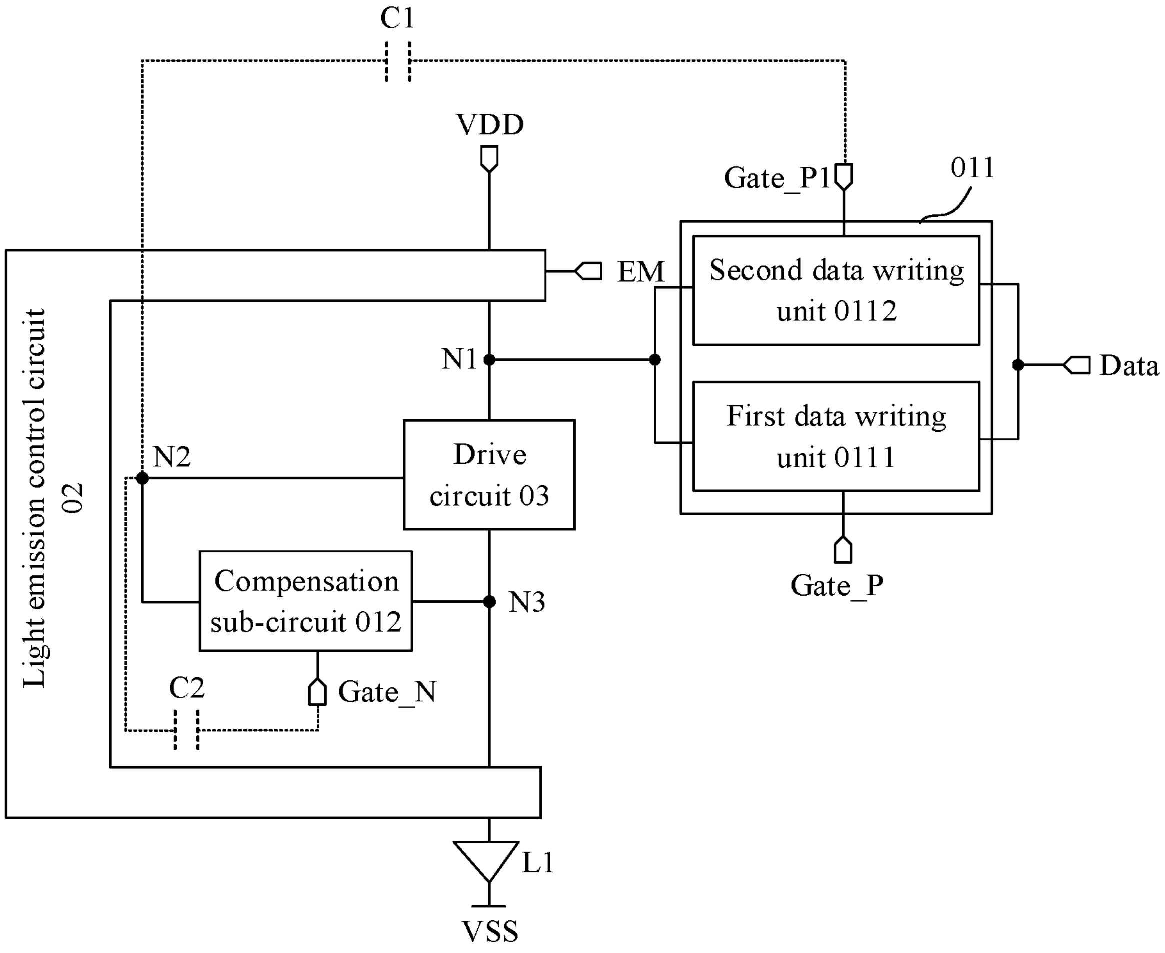
FIG. 3 is a structural schematic diagram of still another pixel circuit according to some embodiments of the present disclosure.

FIG. 3 is a structural schematic diagram of still another pixel circuit according to some embodiments of the present disclosure. As shown in FIG. 3, the data writing sub-circuit 011 in the data writing circuit 01 includes a first data writing unit 0111 and a second data writing unit 0112.

The first data writing unit 0111 is coupled to the first gate signal terminal Gate_P, the data signal terminal Data and the first node N1. The first data writing unit 0111 is configured to control the conduction/non-conduction between the data signal terminal Data and the first node N1 in response to the first gate driving signal.

For example, the first data writing unit 0111 controls the data signal terminal Data to be conducted with the first node N1 when the potential of the first gate driving signal is the effective potential. In addition, the first data writing unit 0111 controls the data signal terminal Data to be non-conducted with the first node N1 when the potential of the first gate driving signal is the ineffective potential.

The second data writing unit 0112 is coupled to the second gate signal terminal Gate_P1, the data signal terminal Data and the first node N1. The second data writing unit 0112 is configured to control the conduction/non-conduction between the data signal terminal Data and the first node N1 in response to the second gate driving signal.

For example, the second data writing unit 0112 controls the data signal terminal Data to be conducted with the first node N1 when the potential of the second gate driving signal is the effective potential. In addition, the second data writing unit 0112 controls the data signal terminal Data to be non-conducted with the first node N1 when the potential of the second gate driving signal is the ineffective potential.

Figure 4:
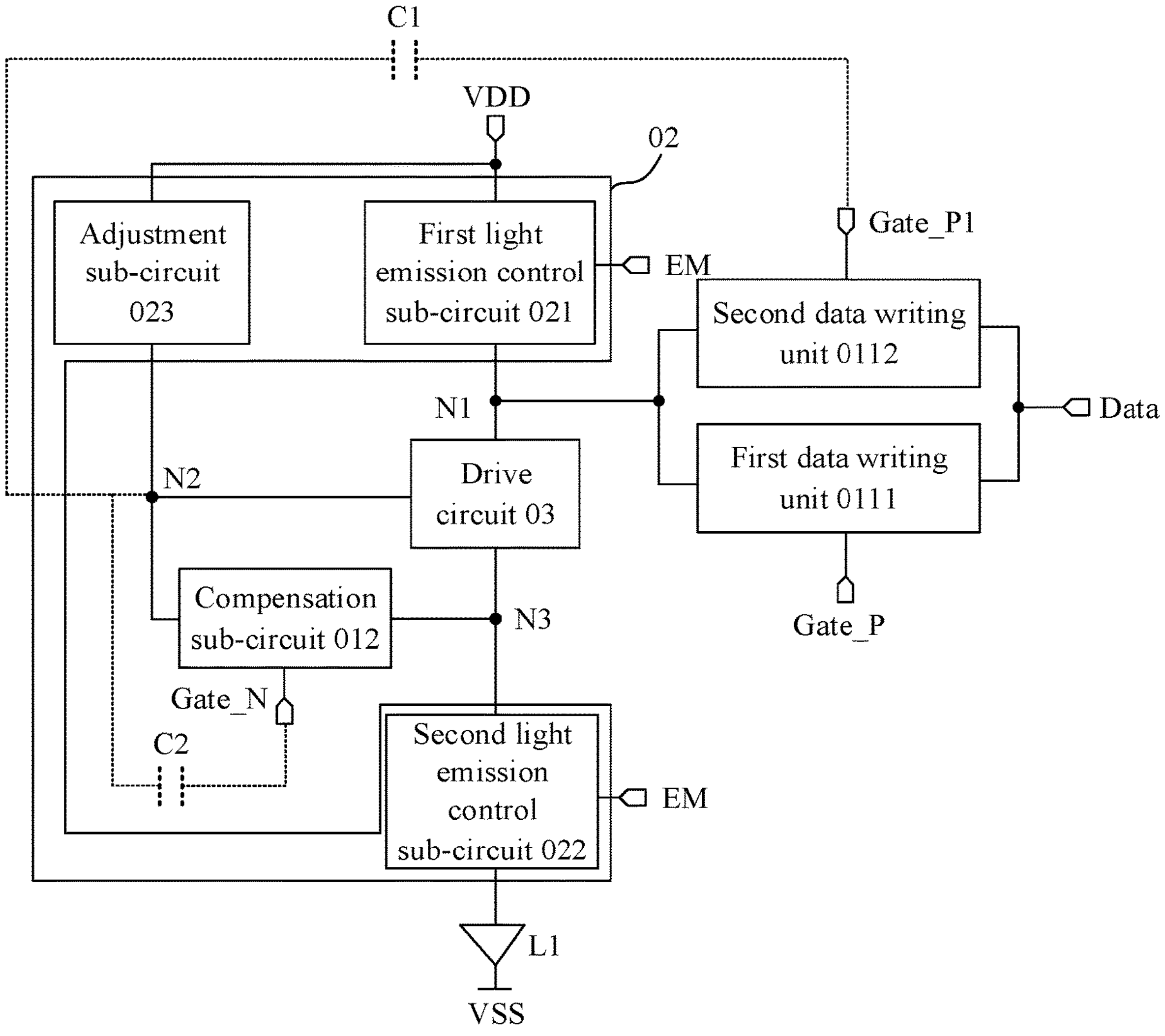
FIG. 4 is a structural schematic diagram of yet still another pixel circuit according to some embodiments of the present disclosure.

FIG. 4 is a structural schematic diagram of yet still another pixel circuit according to some embodiments of the present disclosure. As shown in FIG. 4, the light emission control circuit 02 includes a first light emission control sub-circuit 021, a second light emission control sub-circuit 022 and an adjustment sub-circuit 023.

The first light emission control sub-circuit 021 is coupled to the light emission control terminal EM, the first power supply terminal VDD and the first node N1. The first light emission control sub-circuit 021 is configured to control the conduction/non-conduction between the first power supply terminal VDD and the first node N1 in response to the light emission control signal.

For example, the first light emission control sub-circuit 021 controls the first power supply terminal VDD to be conducted with the first node N1 when the potential of the light emission control signal is the effective potential, such that the first power supply signal provided by the first power supply terminal VDD is transmitted to the first node N1. In addition, the first light emission control sub-circuit 021 controls the first power supply terminal VDD to be non-conducted with the first node N1 when the potential of the light emission control signal is the ineffective potential.

The second light emission control sub-circuit 022 is coupled to the light emission control terminal EM, the third node N3 and the first electrode of the light-emitting element L1, and the second electrode of the light-emitting element L1 is coupled to the second power supply terminal VSS. The second light emission control sub-circuit 022 is configured to control the conduction/non-conduction between the third node N3 and the first electrode of the light-emitting element L1 in response to the light emission control signal. As described in the above embodiments, the first electrode of the light-emitting element L1 is the anode and the second electrode of the light-emitting element L1 is the cathode.

For example, the second light emission control sub-circuit 022 controls the third node N3 to be conducted with the first electrode of the light-emitting element L1 when the potential of the light emission control signal is the effective potential, such that the potential at the third node N3 is transmitted to the first electrode of the light-emitting element L1, to drive the light-emitting element L1 to emit light. In addition, the second light emission control sub-circuit 022 controls the third node N3 to be non-conducted with the first electrode of the light-emitting element L1 when the potential of the light emission control signal is the ineffective potential.

In some embodiments of the present disclosure, the potential of the first power supply signal is the high potential and the potential of the second power supply signal is the low potential.

The adjustment sub-circuit 023 is coupled to the second node N2 and the first power supply terminal VDD. The adjustment sub-circuit 023 is configured to adjust the potential at the second node N2 based on the first power supply signal.

Figure 5:
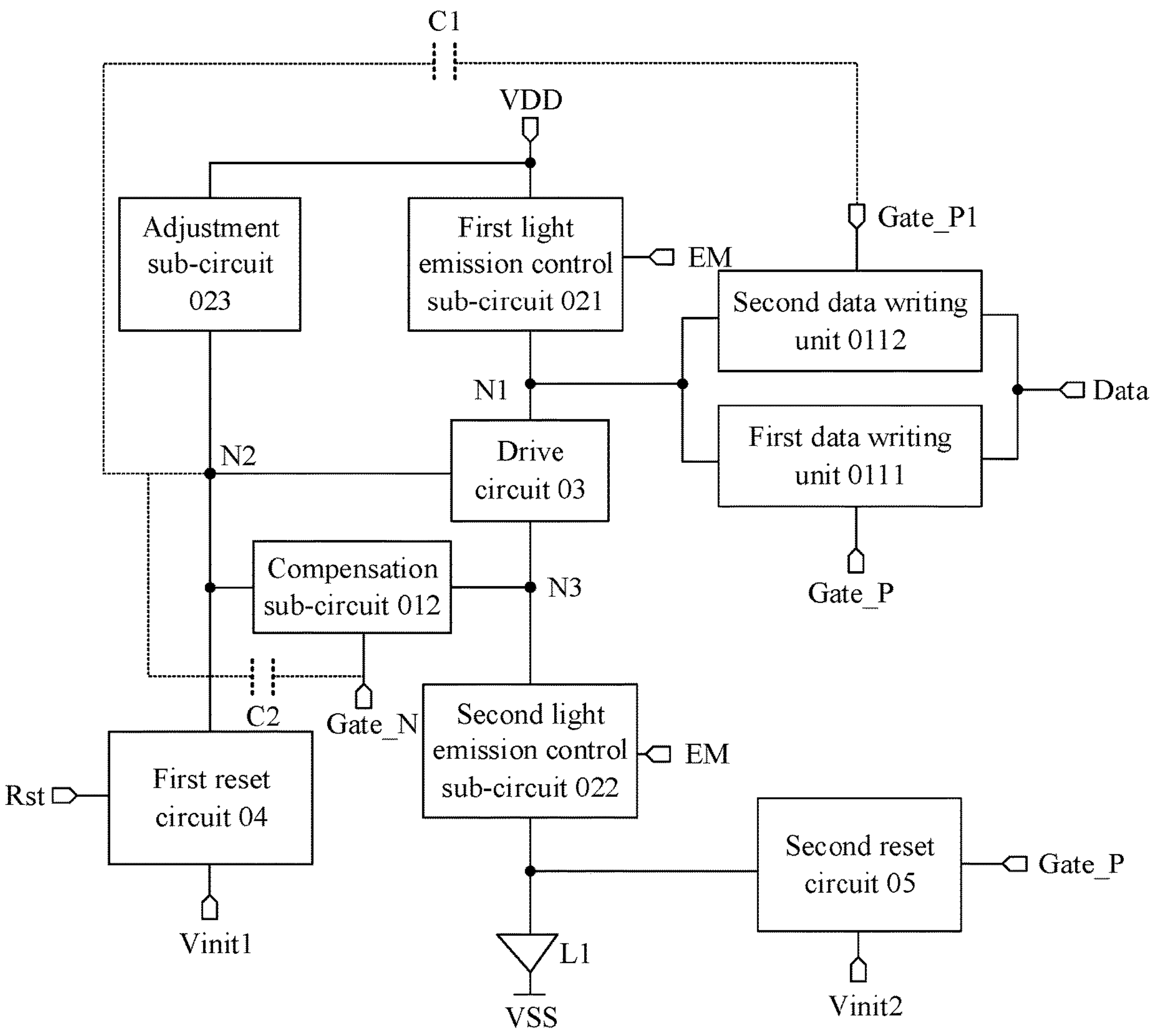
FIG. 5 is a structural schematic diagram of a further pixel circuit according to some embodiments of the present disclosure.

FIG. 5 is a structural schematic diagram of a further pixel circuit according to some embodiments of the present disclosure. As shown in FIG. 5, the pixel circuit further includes a first reset circuit 04 and a second reset circuit 05.

The first reset circuit 04 is coupled to a reset signal terminal Rst, a first reset power supply terminal Vinit1 and the second node N2. The first reset circuit 04 is configured to control the conduction/non-conduction between the first reset power supply terminal Vinit1 and the second node N2 in response to a reset signal provided by the reset signal terminal Rst.

For example, the first reset circuit 04 controls the first reset power supply terminal Vinit1 to be conducted with the second node N2 when the potential of the reset signal is the effective potential. At this time, a first reset power supply signal provided by the first reset power supply terminal Vinit1 is transmitted to the second node N2 to reset the second node N2. In addition, the first reset circuit 04 controls the first reset power supply terminal Vinit1 to be non-conducted with the second node N2 when the potential of the reset signal is the ineffective potential.

The second reset circuit 05 is coupled to the first gate signal terminal Gate_P, a second reset power supply terminal Vinit2 and the light-emitting element L1. The second reset circuit 05 is configured to control the conduction/non-conduction between the second reset power supply terminal Vinit2 and the light-emitting element L1 in response to the first gate driving signal.

For example, the second reset circuit 05 is coupled to the anode of the light-emitting element L1. The second reset circuit 05 controls the second reset power supply terminal Vinit2 to be conducted with the anode of the light-emitting element L1 when the potential of the first gate driving signal is the effective potential. At this time, a second reset power supply signal provided by the second reset power supply terminal Vinit2 is transmitted to the anode of the light-emitting element L1 to reset the anode of the light-emitting element L1. In addition, the second reset circuit 05 controls the second reset power supply terminal Vinit2 to be non-conducted with the anode of the light-emitting element L1 when the potential of the first gate driving signal is the ineffective potential.

In some embodiments of the present disclosure, the potential of the first reset power supply signal and the potential of the second reset power supply signal are both the low potentials. In addition, the potential of the first reset power supply signal is lower than or equal to the potential of the second reset power supply signal. Certainly, in some other embodiments, the potential of the first reset power supply signal is higher than the potential of the second reset power supply signal.

Figure 6:
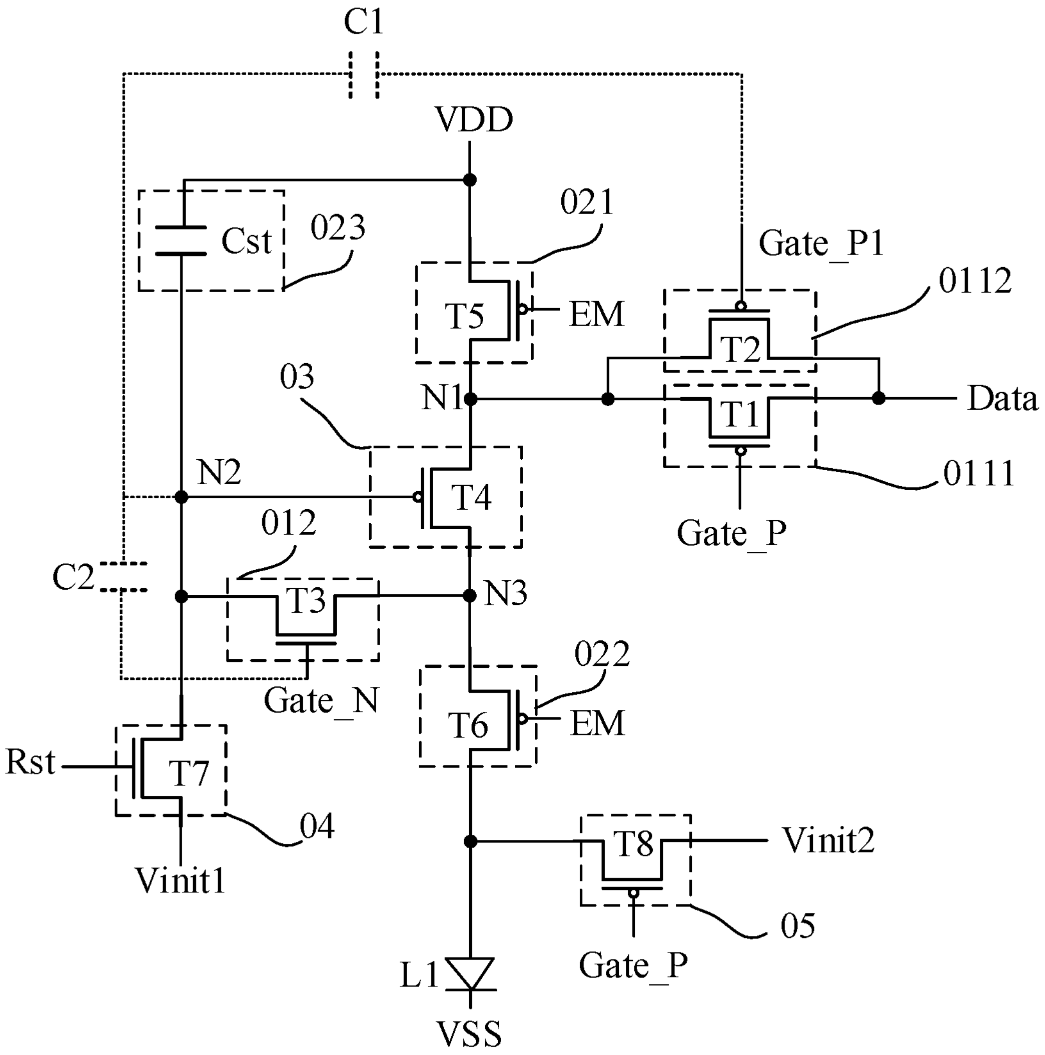
FIG. 6 is a structural schematic diagram of a still further pixel circuit according to some embodiments of the present disclosure.

FIG. 6 is a structural schematic diagram of a still further pixel circuit according to some embodiments of the present disclosure. As shown in FIG. 6, the first data writing unit 0111 includes a first data writing transistor T1; the second data writing unit 0112 includes a second data writing transistor T2; the compensation sub-circuit 012 includes a compensation transistor T3; the drive circuit 03 includes a driving transistor T4; the first light emission control sub-circuit 021 includes a first light emission control transistor T5; the second light emission control sub-circuit 022 includes a second light emission control transistor T6; the adjustment sub-circuit 023 includes a storage capacitor Cst; the first reset circuit 04 includes a first reset transistor T7; and the second reset circuit 05 includes a second reset transistor T8.

A gate of the first data writing transistor T1 is coupled to the first gate signal terminal Gate_P, a first electrode of the first data writing transistor T1 is coupled to the data signal terminal Data, and a second electrode of the first data writing transistor T1 is coupled to the first node N1.

A gate of the second data writing transistor T2 is coupled to the second gate signal terminal Gate_P1, a first electrode of the second data writing transistor T2 is coupled to the data signal terminal Data, and a second electrode of the second data writing transistor T2 is coupled to the first node N1.

On this basis and in conjunction with the descriptions in the above embodiments, at the refresh frame, the potential of the first gate driving signal is controlled to be the low potential, and the potential of the second gate driving signal is controlled to be the high potential, such that the first data writing transistor T1 is turned on and the second data writing transistor T2 is turned off. At this time, the data signal is transmitted to the first node N1 through the first data writing transistor T1 that is turned on so as to write the data signal. At the hold frame, the potential of the first gate driving signal is controlled to be the high potential, and the potential of the second gate driving signal is controlled to be the low potential, such that the first data writing transistor T1 is turned off and the second data writing transistor T2 is turned on. At this time, the data signal is transmitted to the first node N1 through the second data writing transistor T2 that is turned on so as to write the data signal. In other words, at this time, the data signal terminal Data is connected to the second data writing transistor T2 so as to be conducted with the first node N1. Afterwards, after the data signal is written, the potential of the second gate driving signal is controlled to be the high potential, such that the pull-up of the potential at the second node N2 under the coupling effect of the first parasitic capacitance C1 is offset by the pull-down of the potential at the second node N2 under the drive of the jump of the potential of the third gate driving signal, thereby ensuring the stability of the potential at the second node N2.

A gate of the compensation transistor T3 is coupled to the third gate signal terminal Gate_N, a first electrode of the compensation transistor T3 is coupled to the third node N3 and a second electrode of the compensation transistor T3 is coupled to the second node N2.

A gate of the driving transistor T4 is coupled to the second node N2, a first electrode of the driving transistor T4 is coupled to the first node N1 and a second electrode of the driving transistor T4 is coupled to the third node N3.

That is, the gate of the driving transistor T4 is the control terminal of the drive circuit 03, the first electrode of the driving transistor T4 is the input terminal of the drive circuit 03, and the second electrode of the driving transistor T4 is the output terminal of the drive circuit 03.

A gate of the first light emission control transistor T5 is coupled to the light emission control terminal EM, a first electrode of the first light emission control transistor T5 is coupled to the first power supply terminal VDD, and a second electrode of the first light emission control transistor T5 is coupled to the first node N1.

A gate of the second light emission control transistor T6 is coupled to the light emission control terminal EM, a first electrode of the second light emission control transistor T6 is coupled to the third node N3, and a second electrode of the second light emission control transistor T6 is coupled to the first electrode of the light-emitting element L1.

One terminal of the storage capacitor Cst is coupled to the first power supply terminal VDD, and the other terminal of the storage capacitor Cst is coupled to the second node N2.

A gate of the first reset transistor T7 is coupled to the reset signal terminal Rst, a first electrode of the first reset transistor T7 is coupled to the first reset power supply terminal Vinit1, and a second electrode of the first reset transistor T7 is coupled to the second node N2.

A gate of the second reset transistor T8 is coupled to the first gate signal terminal Gate_P, a first electrode of the second reset transistor T8 is coupled to the second reset power supply terminal Vinit2, and a second electrode of the second reset transistor T8 is coupled to the light-emitting element L1.

In addition, as described in the above embodiments, the first data writing transistor T1 and the second data writing transistor T2 are both P-type transistors, and the compensation transistor T3 is an N-type transistor. In addition, in the embodiments of the present disclosure, the first light emission control transistor T5 and the second light emission control transistor T6 are both N-type transistors, the driving transistor T4 is a P-type transistor, the first reset transistor T7 is an N-type transistor, and the second reset transistor T8 is a P-type transistor. On this basis, the effective potential of the light emission control signal and the effective potential of the reset signal are both high potentials, and the ineffective potential of the light emission control signal and the ineffective potential of the reset signal are both low potentials.

Optionally, in the embodiments of the present disclosure, the P-type transistors in the pixel circuit are all transistors made of a low temperature poly-silicon (LTPS) material, and the N-type transistors in the pixel circuit are all transistors made of an oxide material. Correspondingly, the pixel circuit is a low temperature poly-silicon oxide (LTPO) pixel circuit. The oxide material includes an indium gallium zinc oxide (IGZO) material. Here, the material of the transistor refers to the material of an active layer in the transistor.

It should be noted that on the premise that the potential at the second node N2 is stabilized, the pixel circuit described in the embodiments of the present disclosure may also be of a structure including other number of transistors, such as a 6T1C structure, in addition to the 8T1C structure (i.e., including 8 transistors and 1 capacitor) as shown in FIG. 6, which is not limited in the embodiments of the present disclosure.

It should also be noted that the various transistors included in the pixel circuit may be of the types as described in the above embodiments. Certainly, in some other embodiments, the various transistors included in the pixel circuit are of other types. For example, the first reset transistor T7 is a P-type transistor. However, regardless of the types of the transistors, for the P-type transistor, the effective potential is a low potential relative to the ineffective potential; and for the N-type transistor, the effective potential is a high potential relative to the ineffective potential.

In summary, the embodiments of the present disclosure provide a pixel circuit. In the pixel circuit, the data writing circuit is coupled to three gate signal terminals, and controls the potential at the first node, the potential at the second node and the potential at the third node under the control of the gate driving signals provided by the three gate signal terminals. The drive circuit transmits the light emission driving signal to the third node based on the potential at the first node and the potential at the second node. The light emission control circuit controls the third node to be conducted with the light-emitting element, such that the light emission driving signal is further transmitted to the light-emitting element, thereby turning on the light-emitting element. Moreover, the parasitic capacitance is formed between each of the two gate signal terminals and the second node. In this way, the potential at the second node can keep stable by flexibly adjusting the gate driving signals provided by the two gate signal terminals, such that the luminance of the light-emitting element is the same when the pixel circuit drives the light-emitting element at different frames, and the display device has a relatively good display effect.

Figure 7:
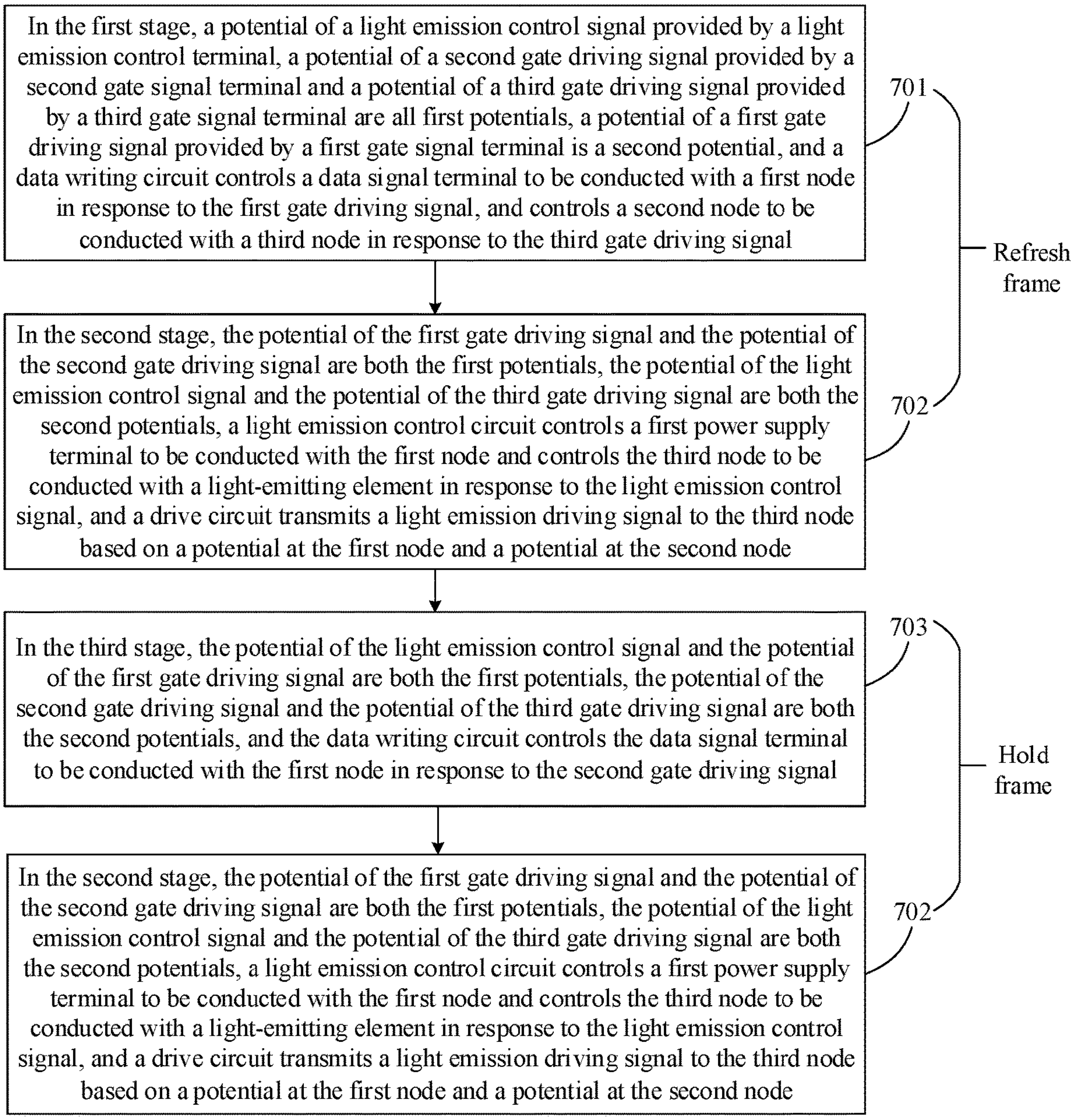
FIG. 7 is a flowchart of a method for driving a pixel circuit according to some embodiments of the present disclosure.

FIG. 7 is a flowchart of a method for driving a pixel circuit according to some embodiments of the present disclosure. The method is applicable for driving the pixel circuit as shown in any one of FIGS. 1 to 6. As shown in FIG. 7, the method includes: a first stage and a second stage sequentially executed at a refresh frame in multi-frame scanning, and a third stage and the second stage sequentially executed at a hold frame in the multi-frame scanning. For example, assuming that there are 60 frames in total, then the 60 frames are divided into 30 refresh frames and 30 hold frames.

In step 701, in the first stage, a potential of a light emission control signal provided by a light emission control terminal, a potential of a second gate driving signal provided by a second gate signal terminal and a potential of a third gate driving signal provided by a third gate signal terminal are all first potentials, a potential of a first gate driving signal provided by a first gate signal terminal is a second potential, and a data writing circuit controls a data signal terminal to be conducted with a first node in response to the first gate driving signal, and controls a second node to be conducted with a third node in response to the third gate driving signal.

In step 702, in the second stage, the potential of the first gate driving signal and the potential of the second gate driving signal are both the first potentials, the potential of the light emission control signal and the potential of the third gate driving signal are both the second potentials, a light emission control circuit controls a first power supply terminal to be conducted with the first node and controls the third node to be conducted with a light-emitting element in response to the light emission control signal, and a drive circuit transmits a light emission driving signal to the third node based on a potential at the first node and a potential at the second node.

In step 703, in the third stage, the potential of the light emission control signal and the potential of the first gate driving signal are both the first potentials, the potential of the second gate driving signal and the potential of the third gate driving signal are both the second potentials, and the data writing circuit controls the data signal terminal to be conducted with the first node in response to the second gate driving signal.

In some embodiments, as described in the above embodiments, in the method, the first potential is a high potential and the second potential is a low potential.

In summary, the embodiments of the present disclosure provide a method for driving the pixel circuit. In this method, from the first stage to the second stage at the refresh frame, the potential of the third gate driving signal provided by the third gate signal terminal jumps to the second potential from the first potential, and thus the potential at the second node is driven to shift for the first time under the coupling effect of the parasitic capacitance formed between the third gate signal terminal and the second node. From the third stage to the second stage at the hold frame, the potential of the second gate driving signal provided by the second gate signal terminal jumps to the first potential from the second potential, and thus the potential at the second node is driven to shift for the second time under the coupling effect of the parasitic capacitance formed between the second gate signal terminal and the second node. Because the first shift occurs when the first potential jumps to the second potential and the second shift occurs when the second potential jumps to the first potential, it is ensured that the potential at the second node keeps stable. Thus, when the pixel circuit drives the light-emitting element at different frames, the luminance of the light-emitting element is the same, and the display device has a relatively good display effect.

Figure 8:
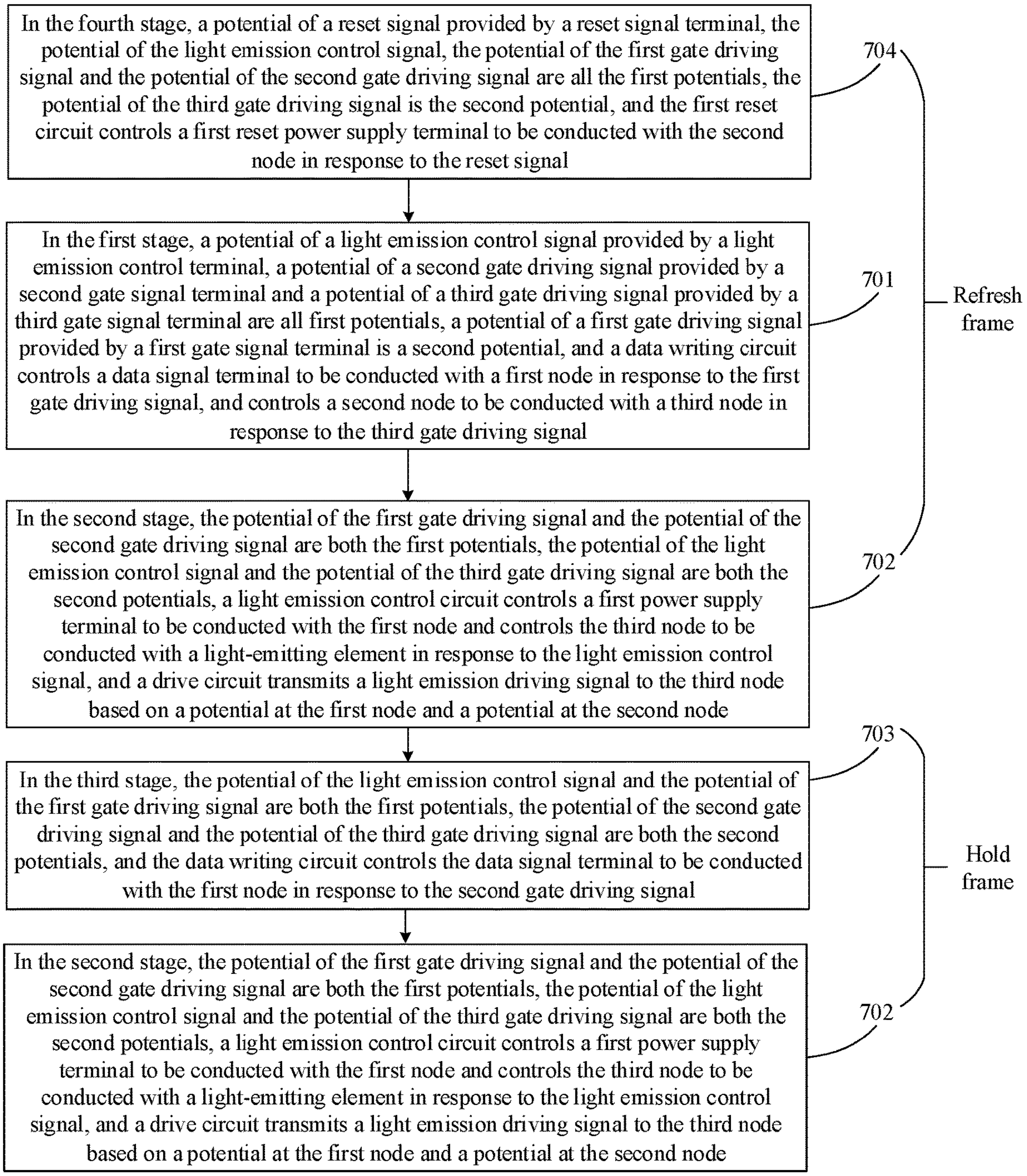
FIG. 8 is a flowchart of another method for driving a pixel circuit according to some embodiments of the present disclosure.

FIG. 8 is a flowchart of another method for driving a pixel circuit according to some embodiment of the present disclosure. As shown in FIG. 8, the method further includes a fourth stage executed before the first stage at the refresh frame. That is, the method further includes step 704 below.

In step 704, in the fourth stage, a potential of a reset signal provided by a reset signal terminal, the potential of the light emission control signal, the potential of the first gate driving signal and the potential of the second gate driving signal are all the first potentials, the potential of the third gate driving signal is the second potential, and the first reset circuit controls a first reset power supply terminal to be conducted with the second node in response to the reset signal.

In the first stage (i.e., in step 701), a second reset circuit controls a second reset power supply terminal to be conducted with the light-emitting element in response to first gate driving signal.

Figure 9:
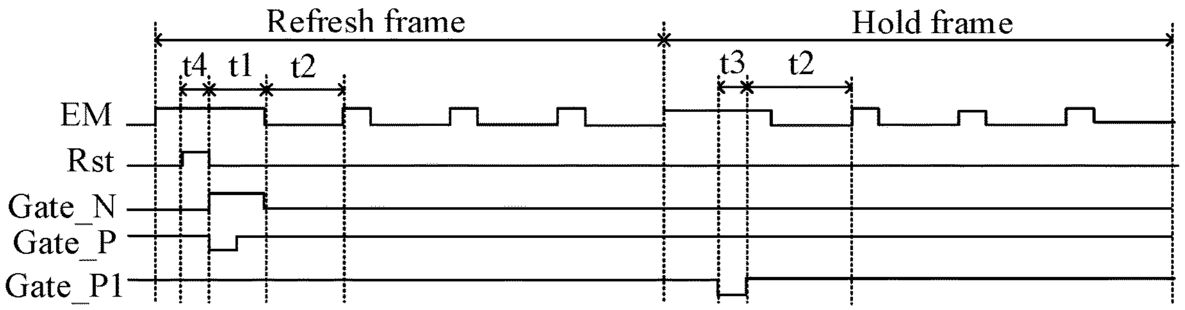
FIG. 9 is a sequence diagram of various signal terminals coupled to the pixel circuit according to some embodiments of the present disclosure.

By taking the pixel circuit shown in FIG. 6, the first potential being the high potential and the second potential being the low potential as an example, the driving principle of the pixel circuit described in the embodiments of the present disclosure is described as follows. FIG. 9 shows a sequence diagram of various signal terminals coupled to the pixel circuit according to some embodiments of the present disclosure. Referring to FIG. 9, it can be seen that the hold frame follows the refresh frame; the refresh frame includes the fourth stage t4, the first stage t1 and the second stage t2 executed in sequence; and the hold frame includes the third stage t3 and the second stage t2 executed in sequence.

In the fourth stage t4, the potential of the light emission control signal provided by the light emission control terminal EM, the potential of the reset signal provided by the reset signal terminal Rst, the potential of the first gate driving signal provided by the first gate signal terminal Gate_P and the potential of the second gate driving signal provided by the second gate signal terminal Gate_P1 are all the high potentials (i.e., first potentials), and only the potential of the third gate driving signal provided by the third gate signal terminal Gate_N is the low potential (second potential). Correspondingly, only the first reset transistor T7 is turned on, and the first data writing transistor T1, the second data writing transistor T2, the compensation transistor T3, the first light emission control transistor T5, the second light emission control transistor T6 and the second reset transistor T8 are all turned off. On this basis, the first reset power supply signal at the low potential provided by the first reset power supply terminal Vinit1 is transmitted to the second node N2 through the first reset transistor T7 which is turned on so as to reset the second node N2, and then the driving transistor T4 is turned on. This fourth stage t4 is also referred to as a reset stage for resetting the second node N2.

In the first stage t1, the potential of the light emission control signal, the potential of the second gate driving signal and the potential of the third gate driving signal are all the high potentials, and the potential of the reset signal and the potential of the first gate driving signal are the low potentials. Correspondingly, the first data writing transistor T1, the second reset transistor T8 and the compensation transistor T3 are all turned on, and the second data writing transistor T2, the first light emission control transistor T5, the second light emission control transistor T6 and the first reset transistor T7 are all turned off. In addition, under the storage effect of the storage capacitor Cst, the potential at the second node N2 first maintains at the low potential in the previous stage t4, and the driving transistor T4 remains turned on. On this basis, the second reset power supply signal at the low potential provided by the second reset power supply terminal Vinit2 is transmitted to the anode of the light-emitting element L1 through the second reset transistor T8 which is turned on, so as to reset the anode of the light-emitting element L1. In addition, the data signal provided by the data signal terminal Data is transmitted to the first node N1 through the first data writing transistor T1 which is turned on, the potential at the first node N1 is transmitted to the third node N3 through the driving transistor T4 which is turned on, and the potential at the third node N3 is transmitted to the second node N2 through the compensation transistor T3 which is turned on. In this way, the data signal is written to the second node N2. The first stage t1 is also referred to as a data writing stage, and a reset stage for resetting the light-emitting element L1.

In the second stage t2, the potential of the first gate driving signal and the potential of the second gate driving signal are both the high potentials, and the potential of the light emission control signal, the potential of the reset signal and the potential of the third gate driving signal are all the low potentials. Correspondingly, the first light emission control transistor T5 and the second light emission control transistor T6 are turned on, and the first data writing transistor T1, the second data writing transistor T2, the compensation transistor T3, the first reset transistor T7 and the second reset transistor T8 are all turned off. In addition, under the storage effect of the storage capacitor Cst, the potential at the second node N2 first maintains at the low potential in the previous stage t4, and the driving transistor T4 remains turned on. On this basis, the first power supply signal at the high potential provided by the first power supply terminal VDD is transmitted to the first node N1 through the first light emission control transistor T5 which is turned on; the third node N3 is conducted with the anode of the light-emitting element L1, and a path is formed between the first power supply terminal VDD and the second power supply terminal VSS. The driving transistor T4 transmits the light emission driving signal to the third node N3 based on the potential at the first node N1 and the potential at the second node N2. The light emission driving signal is then transmitted to the anode of the light-emitting element L1 through the second light emission control transistor T6 which is turned on, and the light-emitting element L1 emits light. The second stage t2 is also referred to as a light emission stage.

In the third stage t3, the potential of the light emission control signal and the potential of the first gate driving signal are both the high potentials, and the potential of the reset signal, the potential of the second gate driving signal and the potential of the third gate driving signal are all the low potentials. Correspondingly, the second data writing transistor T2 is turned on and the first data writing transistor T1, the compensation transistor T3, the first light emission control transistor T5, the second light emission control transistor T6, the first reset transistor T7 and the second reset transistor T8 are all turned off. In addition, under the storage effect of the storage capacitor Cst, the driving transistor T4 remains turned on. The data signal provided by the data signal terminal Data is transmitted to the first node N1 through the second data writing transistor T2 which is turned on. The third stage t3 is also referred to as a data writing stage at the hold frame.

With reference to the above descriptions for each stage, it is further determined that at the refresh frame, the data signal terminal Data is conducted with the first node N1 through the first data writing transistor T1 coupled to the first gate signal terminal Gate_P, and transmits the data signal to the first node N1 through the first data writing transistor T1. At the hold frame, the data signal terminal Data is conducted with the first node N1 through the second data writing transistor T2 coupled to the second gate signal terminal Gate_P1, and transmits the data signal to the first node N1 through the second data writing transistor T2. In addition, from the first stage t1 to the second stage t2 at the refresh frame, the potential of the third gate driving signal jumps from the high potential to the low potential, and the potential at the second node N2 is pulled down under the coupling effect of the second parasitic capacitance C2. From the third stage t3 to the second stage t2 at the hold frame, the potential of the second gate driving signal jumps from the low potential to the high potential, and the potential at the second node N2 is pulled up under the coupling effect of the first parasitic capacitance C1. In this way, the potential at the second node N2 keeps stable. In the embodiments of the present disclosure, in the low-refresh-rate mode, different data signal input transistors (i.e., different data writing transistors) are switched from the refresh frame to the hold frame under the low refresh rate mode, to narrow the data range and reduce the power consumption.

It should be noted that as can be seen from FIG. 9, in the first stage t1, the duration for which the third gate driving signal is at the high potential (i.e., effective potential) is longer than the duration for which the first gate driving signal is at the low potential (i.e., ineffective potential). The duration for which the third gate driving signal is at the effective potential determines the refresh rate. The longer the duration is, the higher the refresh rate is.

In summary, the embodiments of the present disclosure provide a method for driving a pixel circuit. In this method, from the first stage to the second stage at the refresh frame, the potential of the third gate driving signal provided by the third gate signal terminal jumps to the second potential from the first potential, and thus the potential at the second node is driven to shift for the first time under the coupling effect of the parasitic capacitance formed between the third gate signal terminal and the second node. From the third stage to the second stage at the hold frame, the potential of the second gate driving signal provided by the second gate signal terminal jumps to the first potential from the second potential, and thus the potential at the second node is driven to shift for the second time under the coupling effect of the parasitic capacitance formed between the second gate signal terminal and the second node. Because the first shift occurs when the first potential jumps to the second potential and the second shift occurs when the second potential jumps to the first potential, it is ensured that the potential at the second node keeps stable. Thus, when the pixel circuit drives the light-emitting element at different frames, the luminance of the light-emitting element is the same, and the display device has a relatively good display effect.

Figure 10:
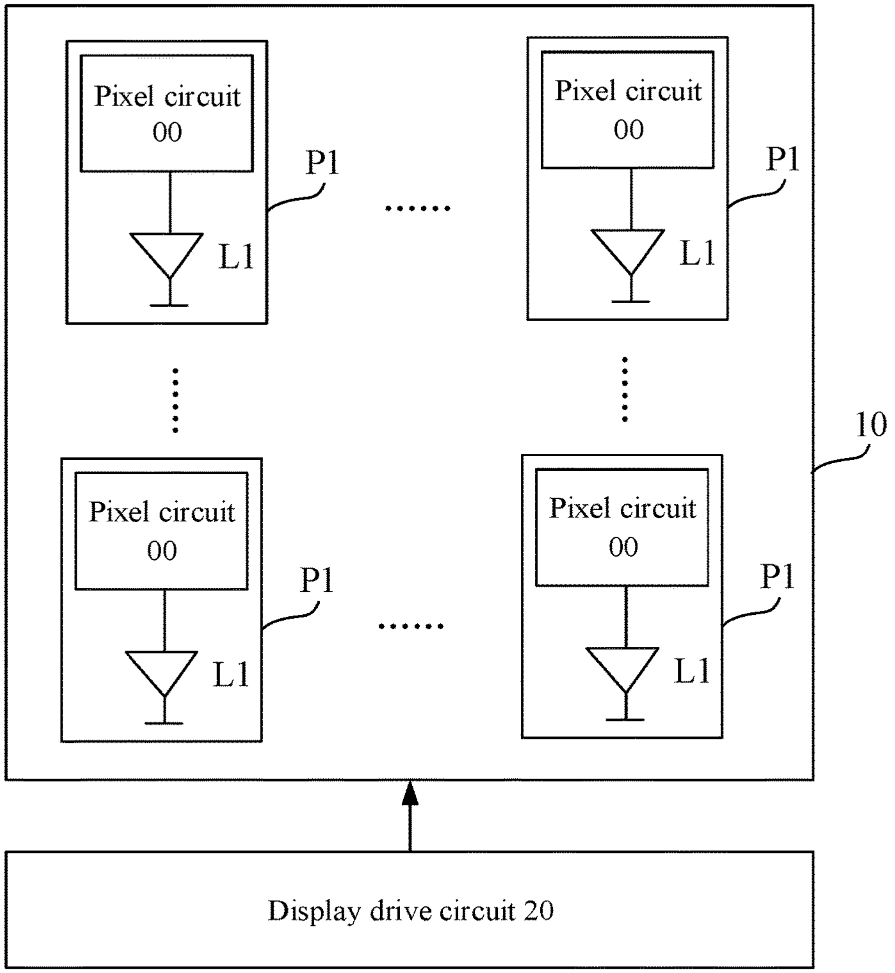
FIG. 10 is a structural schematic diagram of a display device according to some embodiments of the present disclosure.

FIG. 10 is a structural schematic diagram of a display device according to some embodiments of the present disclosure. As shown in FIG. 10, the display device includes a display panel 10, a display drive circuit 20, and a plurality of pixels P1 disposed on the display panel 10. The pixel P1 includes a light-emitting element L1, and the pixel circuit 00 as shown in any one of FIGS. 1 to 6.

The display drive circuit 20 is coupled to each signal terminal coupled to the pixel circuit 00. The display drive circuit 20 is configured to provide a signal to each signal terminal.

The pixel circuit 00 is coupled to the light-emitting element L1. The pixel circuit 00 is configured to transmit a light emission driving signal to the light-emitting element L1, and the light-emitting element L1 is configured to emit light based on the light emission driving signal.

In some embodiments, the display drive circuit 20 includes a gate drive circuit and a source drive circuit. The gate drive circuit is coupled to a gate signal terminal and configured to provide a gate driving signal to the gate signal terminal. The source drive circuit is coupled to a data signal terminal and configured to provide a data signal to the data signal terminal.

In some embodiments, the display device is any product or component having a display function, such as an OLED display device, an active-matrix organic light-emitting diode (AMOLED) display device, a mobile phone, a tablet computer, a flexible display device, a television and a display.

The terms used in the embodiments of the present disclosure are merely intended to explain the embodiments of the present disclosure, instead of limiting the present disclosure. Unless defined otherwise, the technical terms or scientific terms used in the embodiments of the present disclosure shall have the general meaning understood by persons of ordinary skill in the art.

For example, the terms “first,” “second,” “third” and similar terms used in the description and claims of the present disclosure do not denote any order, quantity, or importance, and are merely used to distinguish between different components.

Likewise, the term “one” or “a/an” and similar terms denote at least one, instead of limiting the quantity.

The word “comprise” or “include” and similar terms mean that the element or object appearing before the word “comprise” or “include” covers the listed elements, objects and equivalents thereof appearing after the word “comprise” or “include”, without excluding other elements or objects.

The terms “upper,” “lower,” “left,” right” and the like are used to indicate a relative positional relationship. When an absolute position of the described object changes, the relative positional relationship is also changed accordingly. The word “connected” or “coupled” refers to an electrical connection.

The term “and/or” represents three types of relationships. For example, A and/or B represents three situations: A exists alone, A and B exist simultaneously, and B exists alone. The character “/” herein generally represents an “or” relationship between the associated objects before and after the character.

It should be clearly understood by persons skilled in the art that for ease and brevity of description, for the specific operating processes of the above-described gate drive circuit, shift register unit, circuits and sub-circuits, please refer to the corresponding processes in the method embodiments, and details are not repeated herein.

Described above are merely optional embodiments of the present disclosure, and are not intended to limit the present disclosure. Any modifications, equivalent substitutions, improvements and the like made within the spirit and principles of the present disclosure shall be included within the protection scope of the present disclosure.

What is claimed is:

1. A pixel circuit, comprising:

a data writing circuit, coupled to a first gate signal terminal, a second gate signal terminal, a third gate signal terminal, a data signal terminal, a first node, a second node and a third node, wherein the data writing circuit is configured to control conduction/non-conduction between the data signal terminal and the first node and conduction/non-conduction between the second node and the third node in response to a first gate driving signal provided by the first gate signal terminal, a second gate driving signal provided by the second gate signal terminal, and a third gate driving signal provided by the third gate signal terminal; wherein a first parasitic capacitance is formed between the second gate signal terminal and the second node, and a second parasitic capacitance is formed between the third gate signal terminal and the second node;

a light emission control circuit, coupled to a light emission control terminal, a first power supply terminal, the first node, the third node and a light-emitting element, wherein the light emission control circuit is configured to control conduction/non-conduction between the first power supply terminal and the first node and conduction/non-conduction between the third node and the light-emitting element in response to a light emission control signal provided by the light emission control terminal; and a drive circuit, wherein an input terminal, a control terminal and an output terminal of the drive circuit are coupled to the first node, the second node and the third node respectively, and the drive circuit is configured to transmit a light emission driving signal to the third node based on a potential at the first node and a potential at the second node.

2. The pixel circuit according to claim 1, wherein the data writing circuit comprises a data writing sub-circuit and a compensation sub-circuit; wherein the data writing sub-circuit is coupled to the first gate signal terminal, the second gate signal terminal, the data signal terminal and the first node, and configured to control conduction/non-conduction between the data signal terminal and the first node in response to the first gate driving signal and the second gate driving signal; and the compensation sub-circuit is coupled to the third gate signal terminal, the second node and the third node, and configured to control conduction/non-conduction between the second node and the third node in response to the third gate driving signal.

3. The pixel circuit according to claim 2, wherein the data writing sub-circuit comprises a first data writing unit and a second data writing unit; wherein the first data writing unit is coupled to the first gate signal terminal, the data signal terminal and the first node, and configured to control the conduction/non-conduction between the data signal terminal and the first node in response to the first gate driving signal; and the second data writing unit is coupled to the second gate signal terminal, the data signal terminal and the first node, and configured to control the conduction/non-conduction between the data signal terminal and the first node in response to the second gate driving signal.

4. The pixel circuit according to claim 3, wherein the first data writing unit comprises a first data writing transistor, and the second data writing unit comprises a second data writing transistor; wherein a gate of the first data writing transistor is coupled to the first gate signal terminal, a first electrode of the first data writing transistor is coupled to the data signal terminal, and a second electrode of the first data writing transistor is coupled to the first node; and a gate of the second data writing transistor is coupled to the second gate signal terminal, a first electrode of the second data writing transistor is coupled to the data signal terminal, and a second electrode of the second data writing transistor is coupled to the first node.

5. The pixel circuit according to claim 4, wherein the first data writing transistor and the second data writing transistor are P-type transistors.

6. The pixel circuit according to claim 2, wherein the compensation sub-circuit comprises a compensation transistor; wherein a gate of the compensation transistor is coupled to the third gate signal terminal, a first electrode of the compensation transistor is coupled to the third node, and a second electrode of the compensation transistor is coupled to the second node.

7. The pixel circuit according to claim 6, wherein the compensation transistor is an N-type transistor.

8. The pixel circuit according to claim 1, wherein the drive circuit comprises a driving transistor, the driving transistor being a P-type transistor; wherein a gate of the driving transistor is coupled to the second node, a first electrode of the driving transistor is coupled to the first node, and a second electrode of the driving transistor is coupled to the third node.

9. The pixel circuit according to claim 1, wherein the light emission control circuit comprises a first light emission control sub-circuit, a second light emission control sub-circuit and an adjustment sub-circuit; wherein the first light emission control sub-circuit is coupled to the light emission control terminal, the first power supply terminal and the first node, and configured to control the conduction/non-conduction between the first power supply terminal and the first node in response to the light emission control signal;

the second light emission control sub-circuit is coupled to the light emission control terminal, the third node and a first electrode of the light-emitting element, a second electrode of the light-emitting element is coupled to a second power supply terminal, and the second light emission control sub-circuit is configured to control conduction/non-conduction between the third node and the first electrode of the light-emitting element in response to the light emission control signal; and the adjustment sub-circuit is coupled to the second node and the first power supply terminal, and configured to adjust the potential at the second node based on a first power supply signal provided by the first power supply terminal.

10. The pixel circuit according to claim 9, wherein the first light emission control sub-circuit comprises a first light emission control transistor; the second light emission control sub-circuit comprises a second light emission control transistor; the first light emission control transistor and the second light emission control transistor are N-type transistors; and the adjustment sub-circuit comprises a storage capacitor; wherein a gate of the first light emission control transistor is coupled to the light emission control terminal, a first electrode of the first light emission control transistor is coupled to the first power supply terminal, and a second electrode of the first light emission control transistor is coupled to the first node;

a gate of the second light emission control transistor is coupled to the light emission control terminal, a first electrode of the second light emission control transistor is coupled to the third node, and a second electrode of the second light emission control transistor is coupled to the first electrode of the light-emitting element; and one terminal of the storage capacitor is coupled to the first power supply terminal, and the other terminal of the storage capacitor is coupled to the second node.

11. The pixel circuit according to claim 1, further comprising a first reset circuit and a second reset circuit; wherein the first reset circuit is coupled to a reset signal terminal, a first reset power supply terminal and the second node, and configured to control conduction/non-conduction between the first reset power supply terminal and the second node in response to a reset signal provided by the reset signal terminal; and the second reset circuit is coupled to the first gate signal terminal, a second reset power supply terminal and the light-emitting element, and configured to control conduction/non-conduction between the second reset power supply terminal and the light-emitting element in response to the first gate driving signal.

12. The pixel circuit according to claim 11, wherein the first reset circuit comprises a first reset transistor; and the second reset circuit comprises a second reset transistor; the first reset transistor being an N-type transistor and the second reset transistor being a P-type transistor; wherein a gate of the first reset transistor is coupled to the reset signal terminal, a first electrode of the first reset transistor is coupled to the first reset power supply terminal, and a second electrode of the first reset transistor is coupled to the second node; and a gate of the second reset transistor is coupled to the first gate signal terminal, a first electrode of the second reset transistor is coupled to the second reset power supply terminal, and a second electrode of the second reset transistor is coupled to the light-emitting element.

13. A method for driving a pixel circuit, applicable for driving the pixel circuit as defined in claim 1, the method comprising: a first stage and a second stage sequentially executed at a refresh frame in multi-frame scanning, and a third stage and the second stage sequentially executed at a hold frame in the multi-frame scanning; wherein in the first stage, a potential of a light emission control signal provided by a light emission control terminal, a potential of a second gate driving signal provided by a second gate signal terminal and a potential of a third gate driving signal provided by a third gate signal terminal all are first potentials, a potential of a first gate driving signal provided by a first gate signal terminal is a second potential, and a data writing circuit controls a data signal terminal to be conducted with a first node in response to the first gate driving signal, and controls a second node to be conducted with a third node in response to the third gate driving signal;

in the second stage, the potential of the first gate driving signal and the potential of the second gate driving signal are the first potentials, the potential of the light emission control signal and the potential of the third gate driving signal are the second potentials, a light emission control circuit controls a first power supply terminal to be conducted with the first node and controls the third node to be conducted with a light-emitting element in response to the light emission control signal, and a drive circuit transmits a light emission driving signal to the third node based on a potential at the first node and a potential at the second node; and in the third stage, the potential of the light emission control signal and the potential of the first gate driving signal are the first potentials, the potential of the second gate driving signal and the potential of the third gate driving signal are the second potentials, and the data writing circuit controls the data signal terminal to be conducted with the first node in response to the second gate driving signal.

14. The method according to claim 13, further comprising: a fourth stage executed before the first stage at the refresh frame; wherein in the fourth stage, a potential of a reset signal provided by a reset signal terminal, the potential of the light emission control signal, the potential of the first gate driving signal and the potential of the second gate driving signal are the first potentials, the potential of the third gate driving signal is the second potential, and the first reset circuit controls a first reset power supply terminal to be conducted with the second node in response to the reset signal; and in the first stage, a second reset circuit controls a second reset power supply terminal to be conducted with the light-emitting element in response to the first gate driving signal.

15. A display device, comprising: a display panel, a display drive circuit, and a plurality of pixels disposed on the display panel, wherein the pixel comprises a light-emitting element and a pixel circuit; wherein the pixel circuit comprises:

a data writing circuit, coupled to a first gate signal terminal, a second gate signal terminal, a third gate signal terminal, a data signal terminal, a first node, a second node and a third node, wherein the data writing circuit is configured to control conduction/non-conduction between the data signal terminal and the first node and conduction/non-conduction between the second node and the third node in response to a first gate driving signal provided by the first gate signal terminal, a second gate driving signal provided by the second gate signal terminal, and a third gate driving signal provided by the third gate signal terminal; wherein a first parasitic capacitance is formed between the second gate signal terminal and the second node, and a second parasitic capacitance is formed between the third gate signal terminal and the second node;

a light emission control circuit, coupled to a light emission control terminal, a first power supply terminal, the first node, the third node and the light-emitting element, wherein the light emission control circuit is configured to control conduction/non-conduction between the first power supply terminal and the first node and conduction/non-conduction between the third node and the light-emitting element in response to a light emission control signal provided by the light emission control terminal; and a drive circuit, wherein an input terminal, a control terminal and an output terminal of the drive circuit are coupled to the first node, the second node and the third node respectively, and the drive circuit is configured to transmit a light emission driving signal to the third node based on a potential at the first node and a potential at the second node;

the display drive circuit is coupled to each signal terminal coupled to the pixel circuit, and configured to provide a signal to the each signal terminal; and the pixel circuit is coupled to the light-emitting element, and configured to transmit the light emission driving signal to the light-emitting element, and the light-emitting element is configured to emit light based on the light emission driving signal.

16. The display device according to claim 15, wherein the data writing circuit comprises a data writing sub-circuit and a compensation sub-circuit; wherein the data writing sub-circuit is coupled to the first gate signal terminal, the second gate signal terminal, the data signal terminal and the first node, and configured to control conduction/non-conduction between the data signal terminal and the first node in response to the first gate driving signal and the second gate driving signal; and the compensation sub-circuit is coupled to the third gate signal terminal, the second node and the third node, and configured to control conduction/non-conduction between the second node and the third node in response to the third gate driving signal.

17. The display device according to claim 16, wherein the data writing sub-circuit comprises a first data writing unit and a second data writing unit; wherein the first data writing unit is coupled to the first gate signal terminal, the data signal terminal and the first node, and configured to control the conduction/non-conduction between the data signal terminal and the first node in response to the first gate driving signal; and the second data writing unit is coupled to the second gate signal terminal, the data signal terminal and the first node, and configured to control the conduction/non-conduction between the data signal terminal and the first node in response to the second gate driving signal.

18. The display device according to claim 17, wherein the first data writing unit comprises a first data writing transistor, and the second data writing unit comprises a second data writing transistor; wherein a gate of the first data writing transistor is coupled to the first gate signal terminal, a first electrode of the first data writing transistor is coupled to the data signal terminal, and a second electrode of the first data writing transistor is coupled to the first node; and a gate of the second data writing transistor is coupled to the second gate signal terminal, a first electrode of the second data writing transistor is coupled to the data signal terminal, and a second electrode of the second data writing transistor is coupled to the first node.

19. The display device according to claim 18, wherein the first data writing transistor and the second data writing transistor are P-type transistors.

20. The display device according to claim 16, wherein the compensation sub-circuit comprises a compensation transistor; wherein a gate of the compensation transistor is coupled to the third gate signal terminal, a first electrode of the compensation transistor is coupled to the third node, and a second electrode of the compensation transistor is coupled to the second node.

* * * * *